(12) United States Patent
Shapiro

(10) Patent No.: US 11,859,433 B2
(45) Date of Patent: Jan. 2, 2024

(54) DOOR

(71) Applicant: Mikhail D. Shapiro, Rochester, NY (US)

(72) Inventor: Mikhail D. Shapiro, Rochester, NY (US)

( * ) Notice: Subject to any disclaimer, the term of this patent is extended or adjusted under 35 U.S.C. 154(b) by 229 days.

(21) Appl. No.: 17/548,528

(22) Filed: Dec. 11, 2021

(65) Prior Publication Data

US 2023/0184028 A1 Jun. 15, 2023

(51) Int. Cl.
| | | |
|---|---|---|
| *E05F 17/00* | (2006.01) | |
| *F16H 3/66* | (2006.01) | |
| *B65D 51/24* | (2006.01) | |
| *B65D 43/18* | (2006.01) | |
| *E06B 3/50* | (2006.01) | |

(52) U.S. Cl.
CPC ............ *E05F 17/004* (2013.01); *B65D 43/18* (2013.01); *B65D 51/245* (2013.01); *F16H 3/66* (2013.01); *E06B 3/5009* (2013.01)

(58) Field of Classification Search
CPC .......... F16K 3/03; E05F 17/004; B65D 43/18; B65D 51/245; F16H 3/66; E06B 3/5009; E06B 3/92; E06B 11/026; E05Y 2900/602; E05Y 2201/72
See application file for complete search history.

(56) References Cited

U.S. PATENT DOCUMENTS

| | | | | |
|---|---|---|---|---|
| 2,307,273 | A * | 1/1943 | Hughes | F16K 3/03 251/118 |
| 6,375,155 | B1 * | 4/2002 | Janssens | F16L 55/10 251/212 |
| 6,605,176 | B2 * | 8/2003 | Tzu | H01J 37/18 118/695 |
| 8,430,140 | B2 * | 4/2013 | Ognjanovski | B60K 15/0406 251/212 |
| 10,858,813 | B1 * | 12/2020 | Nelson | E03C 1/2306 |
| 11,353,119 | B2 * | 6/2022 | Kiessling | F16K 31/535 |
| 11,767,664 | B2 * | 9/2023 | Nelson | E03C 1/2306 4/689 |

\* cited by examiner

*Primary Examiner* — Victor L MacArthur
(74) *Attorney, Agent, or Firm* — Jong Patent Firm; Cheng Ning Jong; Tracy P. Jong

(57) ABSTRACT

A door for allowing access to an interior space of a housing, one end of the housing is sealed with a cover having a plurality of cover components, the door comprising: a sun gear comprising a rotational axis, the sun gear is attached to the housing; a ring having a central axis coaxially disposed with the rotational axis of the sun gear; and a plurality of planetary gears evenly distributed about the central axis of the ring, each the planetary gear comprising a rotational axis and rotationally coupled to the ring and the sun gear, wherein the rotational axis of each the planetary gear is disposed parallel to the central axis of the ring, wherein each of the cover components is configured to be attached to one of the plurality of planetary gears and when the ring is rotated with respect to the housing, the plurality of cover components separate.

18 Claims, 21 Drawing Sheets

DOOR

BACKGROUND OF THE INVENTION

1. The Field of the Invention

The present invention relates to a door configured to be opened and closed all within a plane. More specifically, the present invention is directed to a door configured to be opened and closed all within a plane and the door is an aggregate of cover components.

2. Background Art

Conventional doors are hinged at one edge or configured to slide along an edge in a plane. If configured to slide along an edge, e.g., in the case of a pocket door, the door is moved in its entirety to clear an opening it conceals to reveal the opening or it is slid over the opening to conceal the opening when the opening is desired to be closed. Even for a hinged door that can be swung out of the way by rotating the door about its hinge axis, the rotational angle that the door is required to traverse is at least about 90 degrees. Therefore, it takes more effort and more time to open or close a door that comes in a single piece than doors that come in more than one piece. Further, for a small area, a hinge door can take up valuable space around the door. When used as a container sized according to human hands, a container with a screw type lid or a container with a hinged door requires its user to unscrew the lid or to rotate the lid out of the way as in the case of the hinged lid, thereby requiring increased effort on the user's part to open or close the container.

There exists a need for a door that is disposed within a plane when it is opened or closed and one that can be opened or closed expeditiously without requiring the door to traverse large distances during the opening or closing action of the door. One of the ways to simplify an opening or closing action is by making the opening or closing action a twisting action. Therefore, there also exists a need for the interior space of a container to be accessible via a twisting action.

SUMMARY OF THE INVENTION

In accordance with the present invention, there is provided a door for allowing access to an interior space of a housing, one end of the housing is sealed with a cover having a plurality of cover components, the door including:
(a) a sun gear including a rotational axis, the sun gear configured to be attached to the housing;
(b) a ring having a central axis coaxially disposed with the rotational axis of the sun gear; and
(c) a plurality of planetary gears evenly distributed about the central axis of the ring, each of the planetary gears including a rotational axis and rotationally coupled to the ring and the sun gear, wherein the rotational axis of each the planetary gear is disposed parallel to the central axis of the ring,
wherein each of the cover components is configured to be attached to one of the plurality of planetary gears and when the ring is rotated with respect to the housing, the plurality of cover components separate to allow access to the interior space of the housing.

In one embodiment, the plurality of planetary gears is six planetary gears. In one embodiment, the cover is configured to be disposed in one of two closed states and the door further includes two images, each associated with the one of the two closed states. In one embodiment, the cover is configured to be disposed in one of two closed states and an angle of rotation between the two closed states is about 300 degrees. In one embodiment, each of the cover components includes a stopper and the cover is configured to be disposed in only one closed state. In one embodiment, at least one of the cover components includes a sector including at least one edge that is non-rectilinear. In one embodiment, the cover includes a polygonal shape. In one embodiment, the cover is a hexagon.

An object of the present invention is to provide a cover disposed in a first plane where the cover can be opened and closed without disposing the cover in a plane that is not coplanar with the first plane.

Another object of the present invention is to provide a cover disposed in a first plane where the cover can be opened and closed without disposing the cover in a plane that is not coplanar with the first plane and the cover can be fully disposed away from concealing an opening with substantially little rotation of the cover or components constituting the cover.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—door
4—sun gear
6—planetary gear
8—structure or ring supporting planetary gears
10—cover component
12—post
14—structure or housing upon which sun gear is disposed
16—taper
17—groove
18—plane within which cover components are disposed
19—protrusion
20—slot
22—stopper
24—stalk
26—interior space
28—edge
30—central axis of ring or planetary gears
32—minor ring
34—axis of rotation of planetary gear
36—relative rotation
38—direction
40—direction
42—relative rotation

PARTICULAR ADVANTAGES OF THE INVENTION

The present door includes cover components for blocking an opening without the use of a hinge as the cover components are configured to move within a plane to come together and cooperate to form a cover to seal the opening. The same cover components are configured to be removable also within the same plane and without the use of a hinge which can often take up a significant amount of space surrounding the opening.

The present door can be opened or closed more expeditiously than hinged doors. A relative rotation of two structures, one of which supports a plurality of cover components coupled to planetary gears and the other one of which supports a sun gear rotationally coupled to the planetary gears, can cause the cover components to be disposed in an open state from a closed state or disposed in a closed state from an open state with a relative rotation as little as 15 degrees. In one embodiment, a continued relative rotation can cause the cover components to be disposed in an opposite state.

In one embodiment, the cover components can be disposed in one of two closed states. An image can be associated with each of the two closed states. Therefore, a desired image of the two images can be chosen and displayed simply by disposing the cover in a particular closed state.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
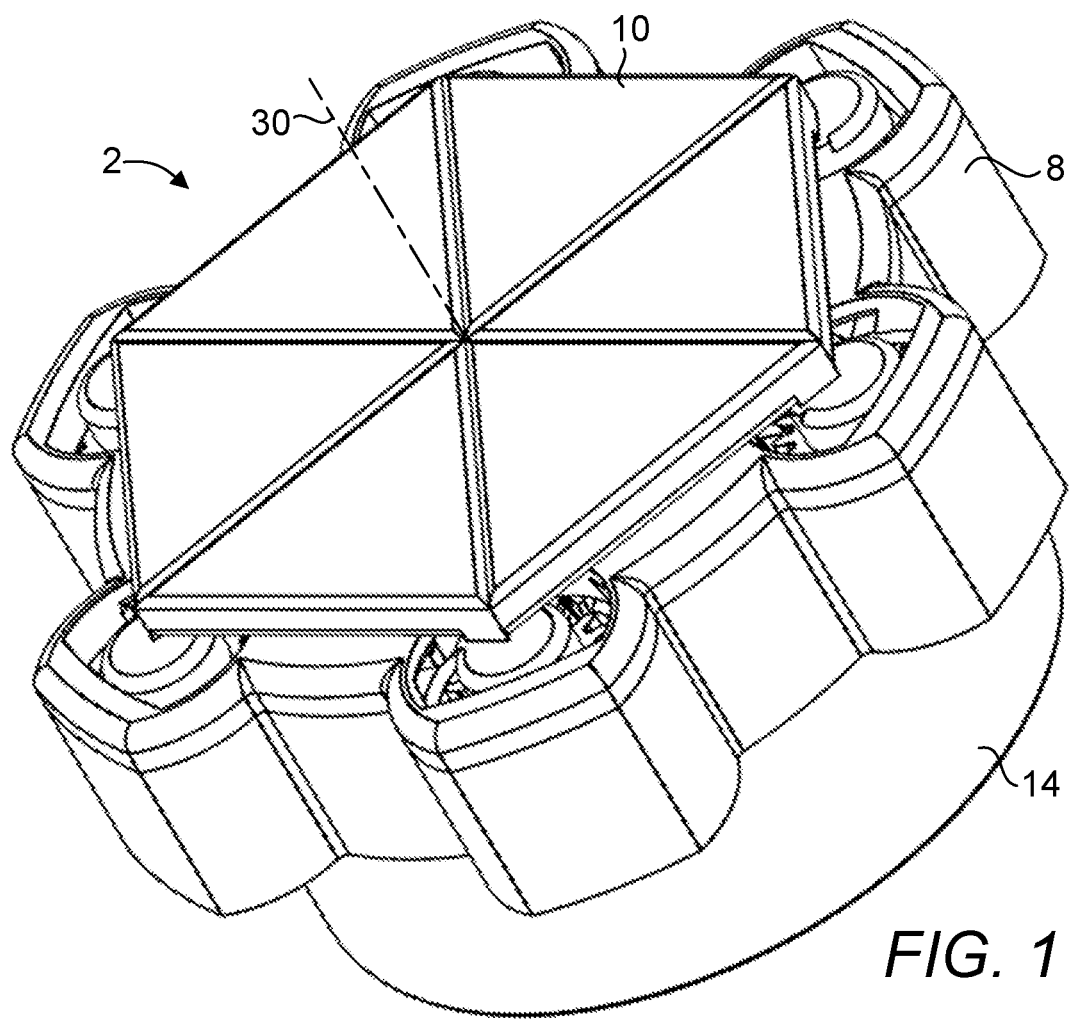
FIG. 1 is a top perspective view of a container having an interior space protected with a door openable by twisting the body of the container.
Figure 2:
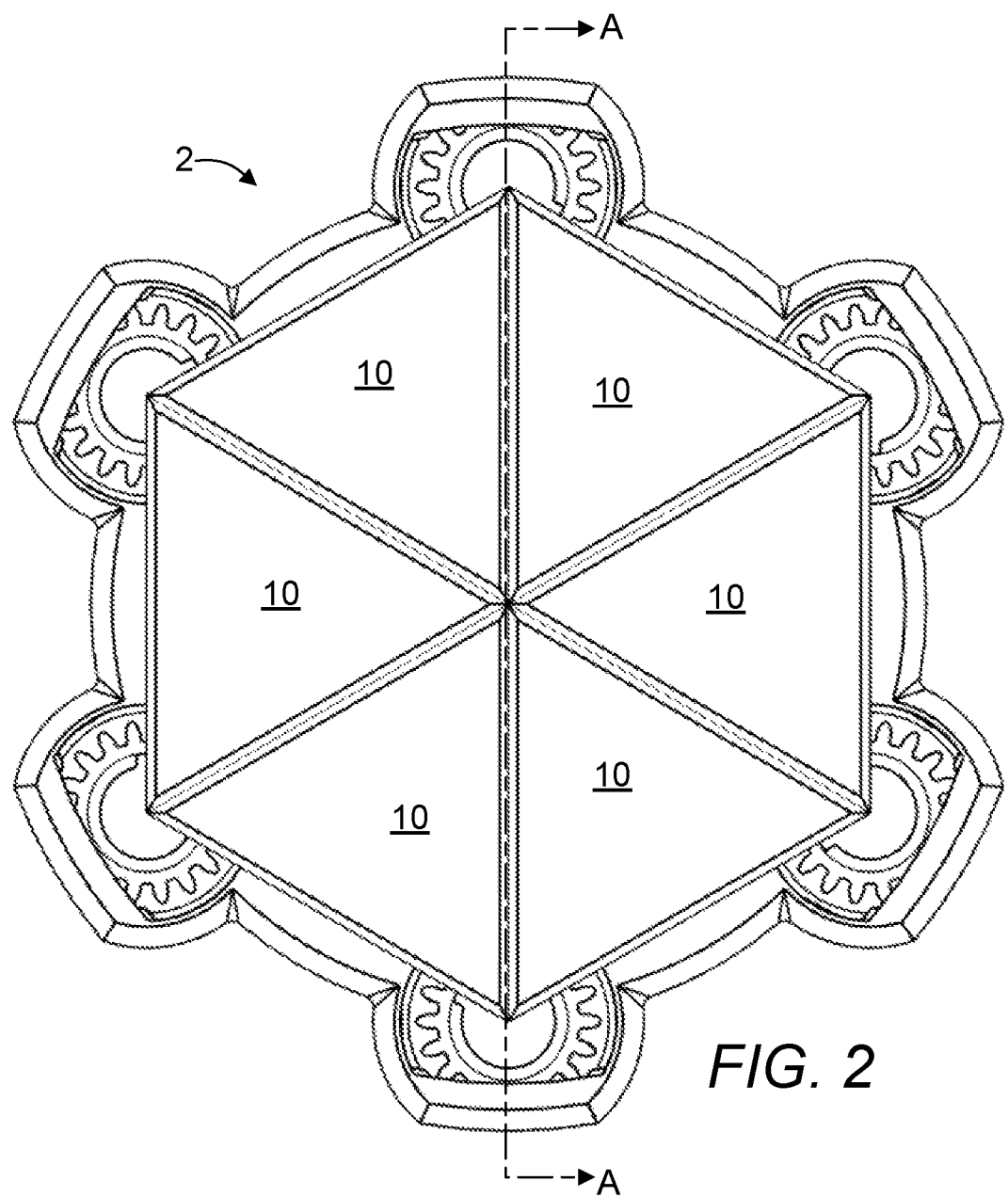
FIG. 2 is a top view thereof.
Figure 3:
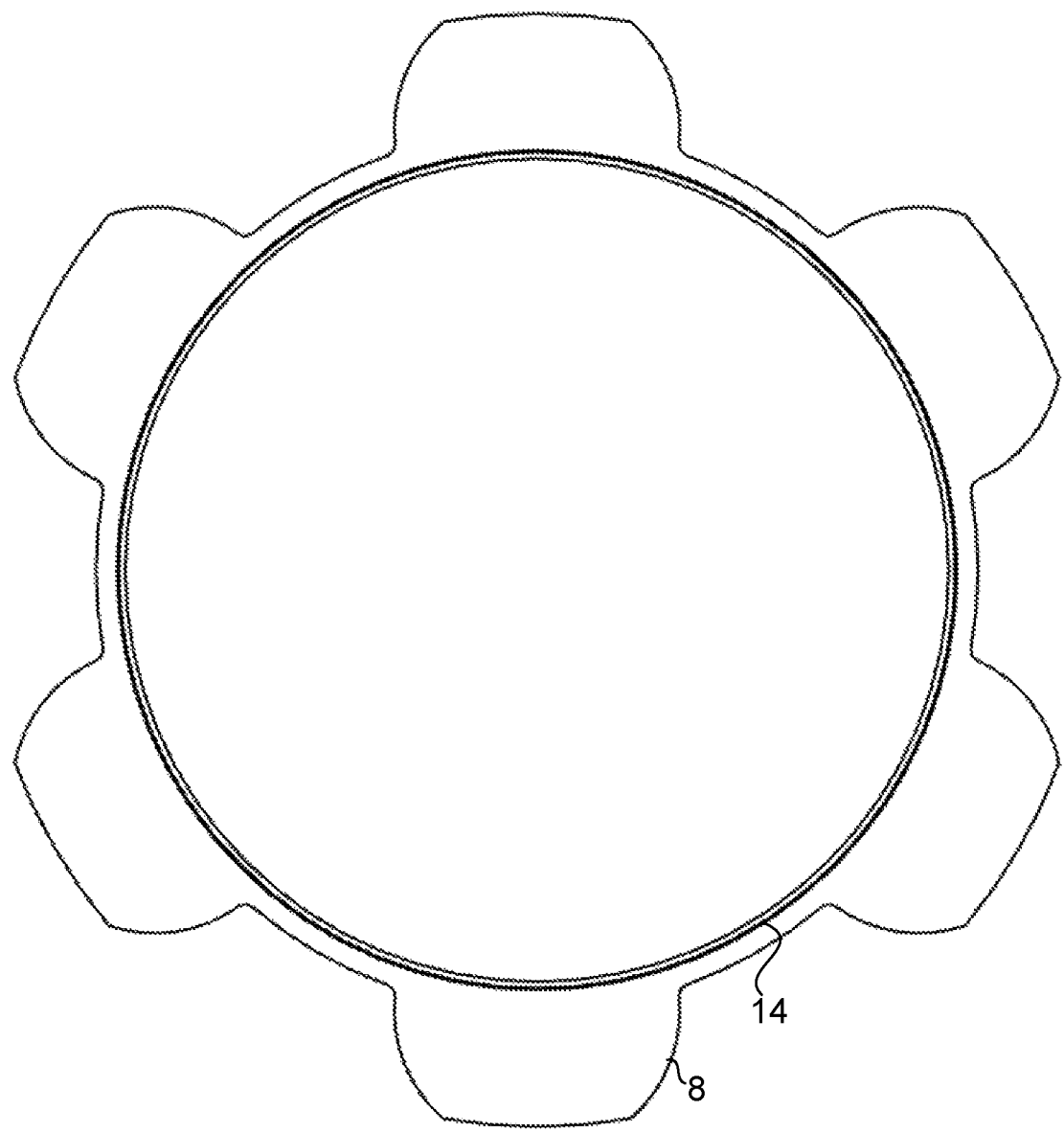
FIG. 3 is a bottom view thereof.
Figure 4:
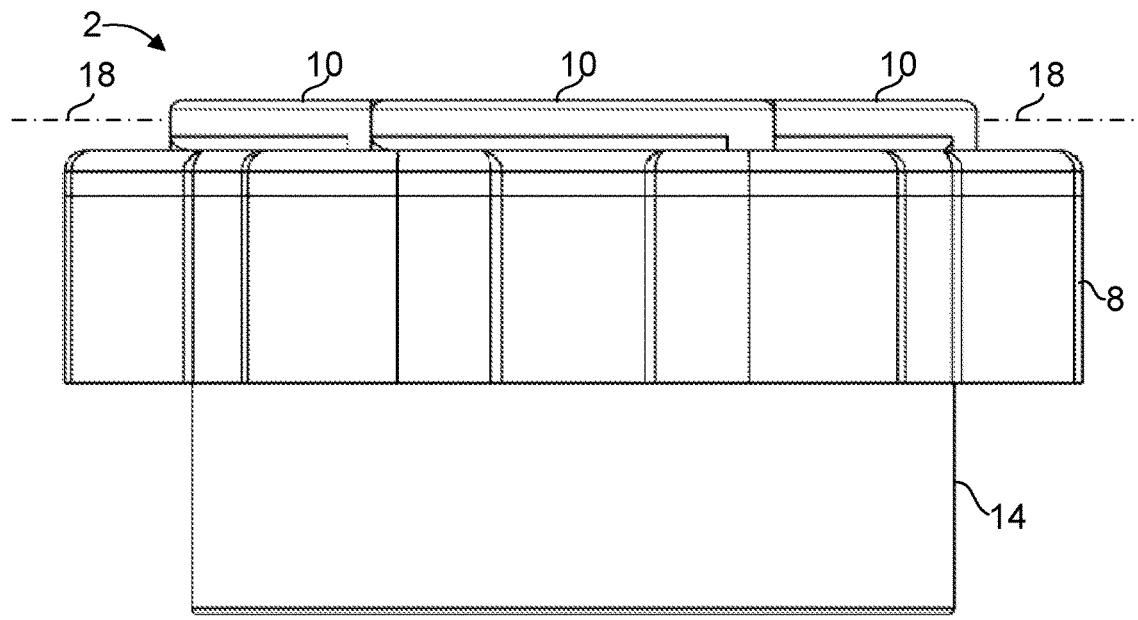
FIG. 4 is a side view thereof.
Figure 5:
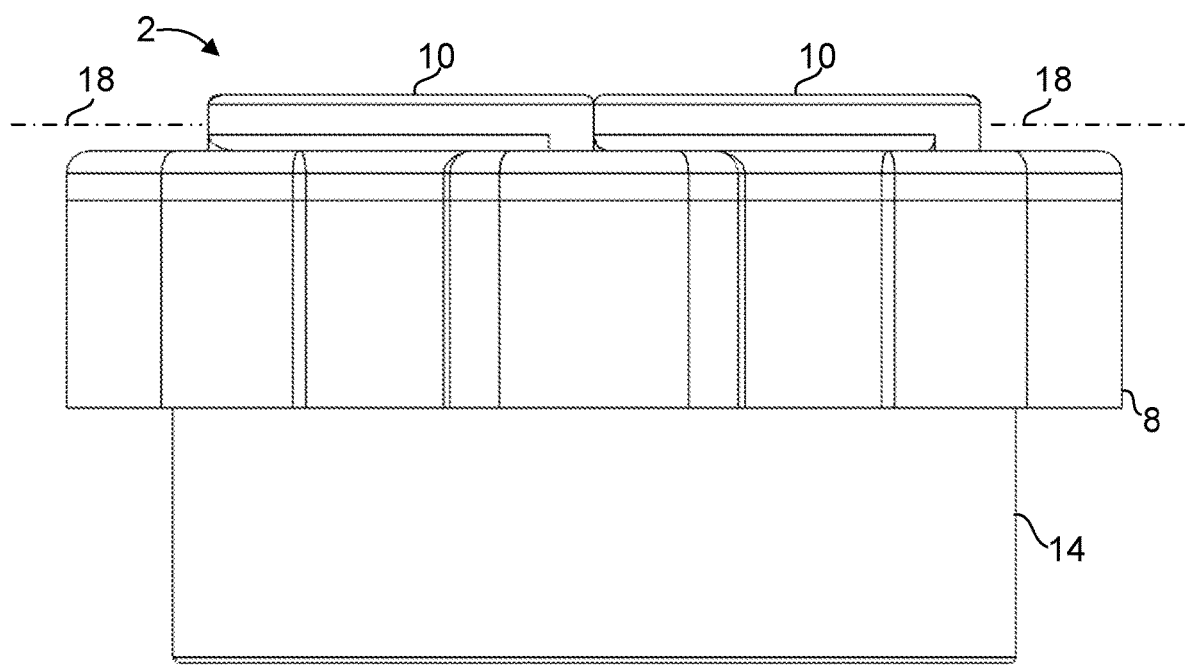
FIG. 5 is yet another side view thereof.
Figure 6:
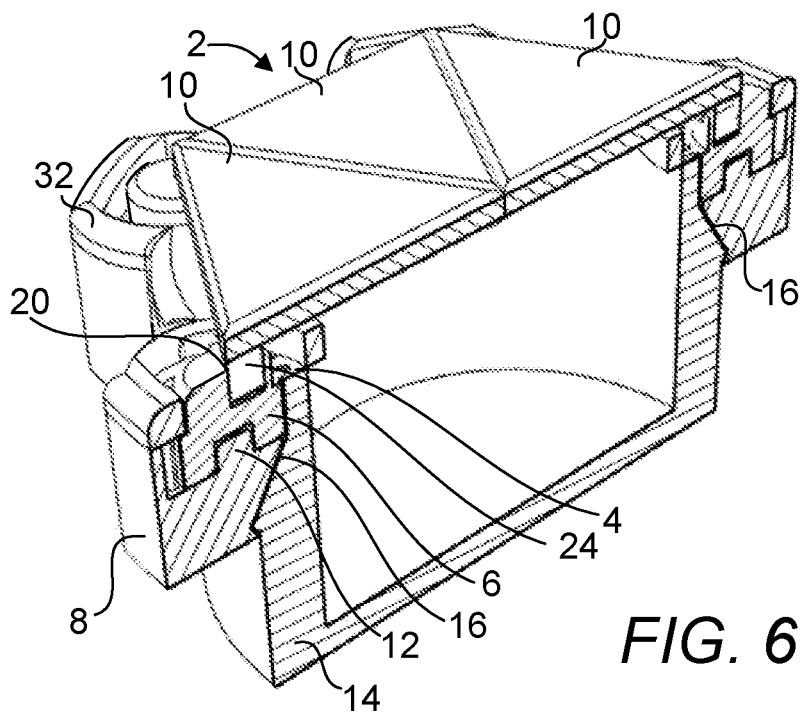
FIG. 6 is a top perspective cross-sectional view of the container shown in FIG. 2 as taken along line A-A.
Figure 7:
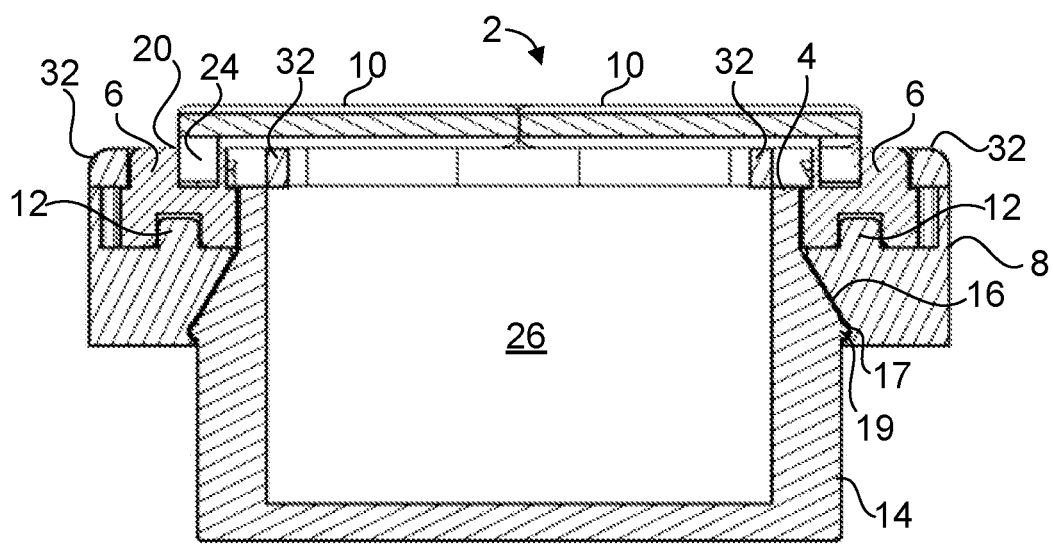
FIG. 7 is a side view thereof.

FIG. 1 is a top perspective view of a container having an interior space protected with a door 2 openable by twisting the body of the container; FIG. 2 is a top view thereof; FIG. 3 is a bottom view thereof; FIG. 4 is a side view thereof; FIG. 5 is yet another side view thereof; FIG. 6 is a top perspective cross-sectional view of the container shown in FIG. 2 along line A-A; FIG. 7 is a side view thereof. The body includes a structure or ring 8 that supports a plurality of planetary gears 6 and a structure 14 upon which a sun gear 4 is disposed. Disclosed herein is a door 2 for allowing access to an interior space 26 of a housing. The housing is essentially made up of the two structures 8, 14. One end of the housing is sealed with a cover composed of a plurality of cover components 10. The door includes a sun gear 4, a ring 8 and a plurality of planetary gears 6. The sun gear 4 includes a rotational axis and the sun gear 4 is configured to be attached to the housing. The ring has a central axis 30 coaxially disposed with the rotational axis of the sun gear 4. The plurality of planetary gears 6 are evenly distributed about the central axis of the ring. Each planetary gear 6 includes a rotational axis and each planetary gear 6 is rotationally coupled to the ring. The rotational axis of each planetary gear 6 is disposed parallel to the central axis of the ring and supported on a post 12. Each of the cover components 10 is configured to be attached to one of the plurality of planetary gears 6 by way of inserting a stalk 24 of a cover component 10 into a slot 20 of a planetary gear 6. The cross-sectional shape of each slot is preferably not circular and preferably uniquely shaped such that a stalk 24 can only be inserted in a slot 20 when disposed in a unique orientation, to ease installation. When the ring is rotated with respect to the housing, the plurality of cover components separate to allow access to the interior space 26 of the housing. It shall be noted that, the present cover is applied to an opening that is circular in shape and each planetary gear 6 is disposed at a vertex of a hexagon and the each cover component is configured in the shape of a triangle and another vertex from each hexagon will meet with another like vertex of another hexagon at the center of the hexagonally-shaped cover formed from all the cover components 10. In the embodiments shown throughout herein, the shape of the cover is a hexagon and six planetary gears are used, each disposed at a vertex of the hexagon. The present concept of using cover components to form a cover to seal, is extendable to openings of other shapes, e.g., a pentagon, a square, a triangle, a septagon, an octagon or another polygon, as long as the cover components are configured to be triangles and a vertex of the triangle meets vertices of other identically-shaped triangles at the center of the polygon. Referring to FIGS. 6 and 7, the interface at which ring 8 is supported by structure 14 is preferably slanted with a taper 16 and ring 8 is preferably retained with a groove 17 disposed at a bottom periphery of ring 8 and a matching protrusion 19 disposed on structure 14. Other means for facilitating this interface are possible, e.g., with bearings to lessen resistance experienced in the relative rotation of structure 14 and the ring 6. The rings disposed around each planetary gear 6 minor rings 32 need not protrude within the opening of the interior space 26. However, for an application where the entrance size of the opening to the interior space 26 is not a concern, the minor rings 32 may be configured in the manner shown throughout. The minor rings 32 need not be configured in the manner shown throughout. However, for a container configured to be hand operated, the minor rings 32 help improve grasps while held in a user's hand. Further, although not shown, the planetary gears may alternatively be configured to ride on a ring gear instead of a sun gear provided that a relative movement between the two types of gear can cause synchronized movements to multiple components which drive the cover components. A ring gear is a gear having teeth disposed on the inner race of the gear.

Figure 8:
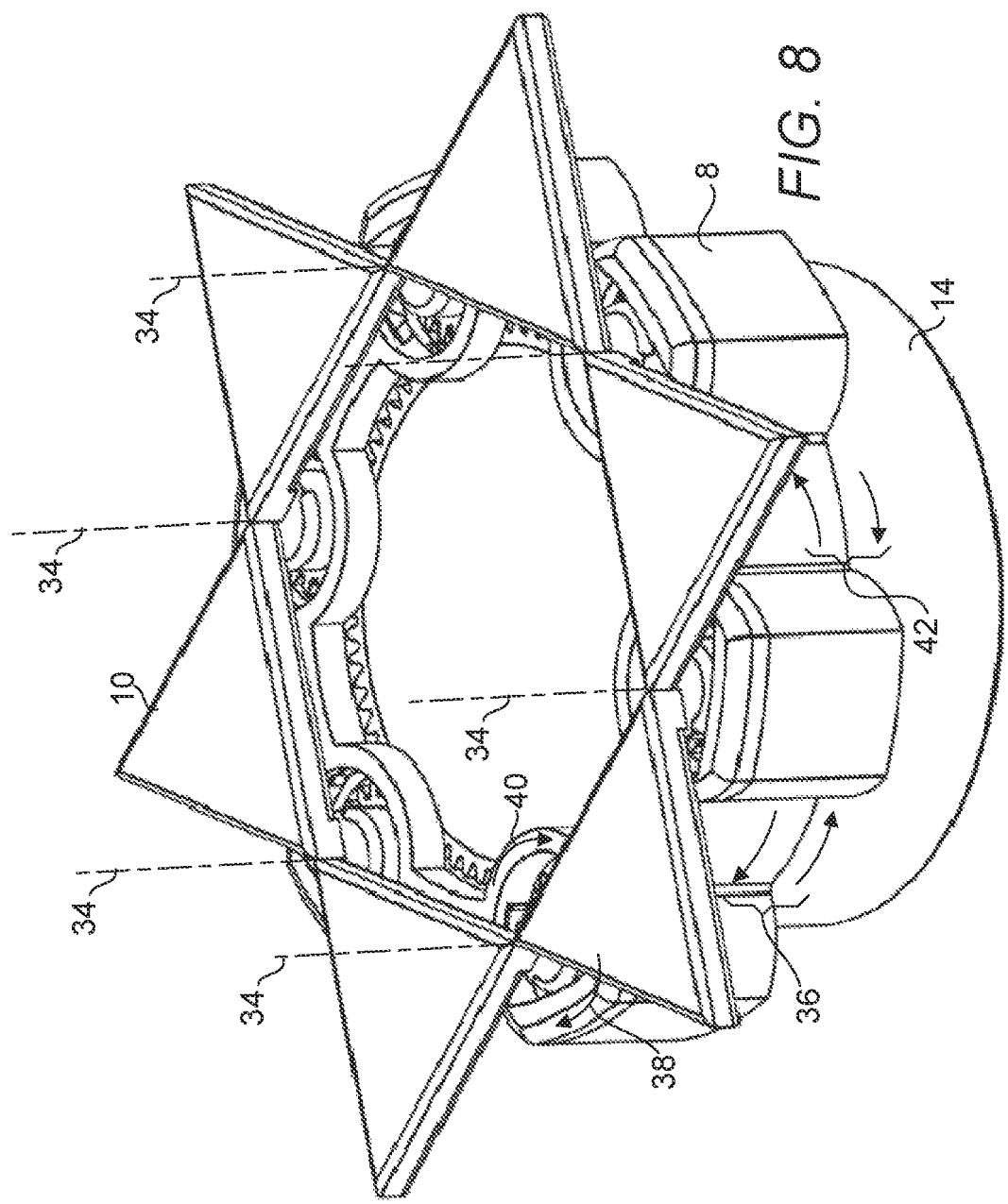
FIG. 8 is a top perspective view of a container of having an interior space exposed by disposing the door which covers an opening to the interior space in an orientation to just clear the opening to the interior space.
Figure 9:
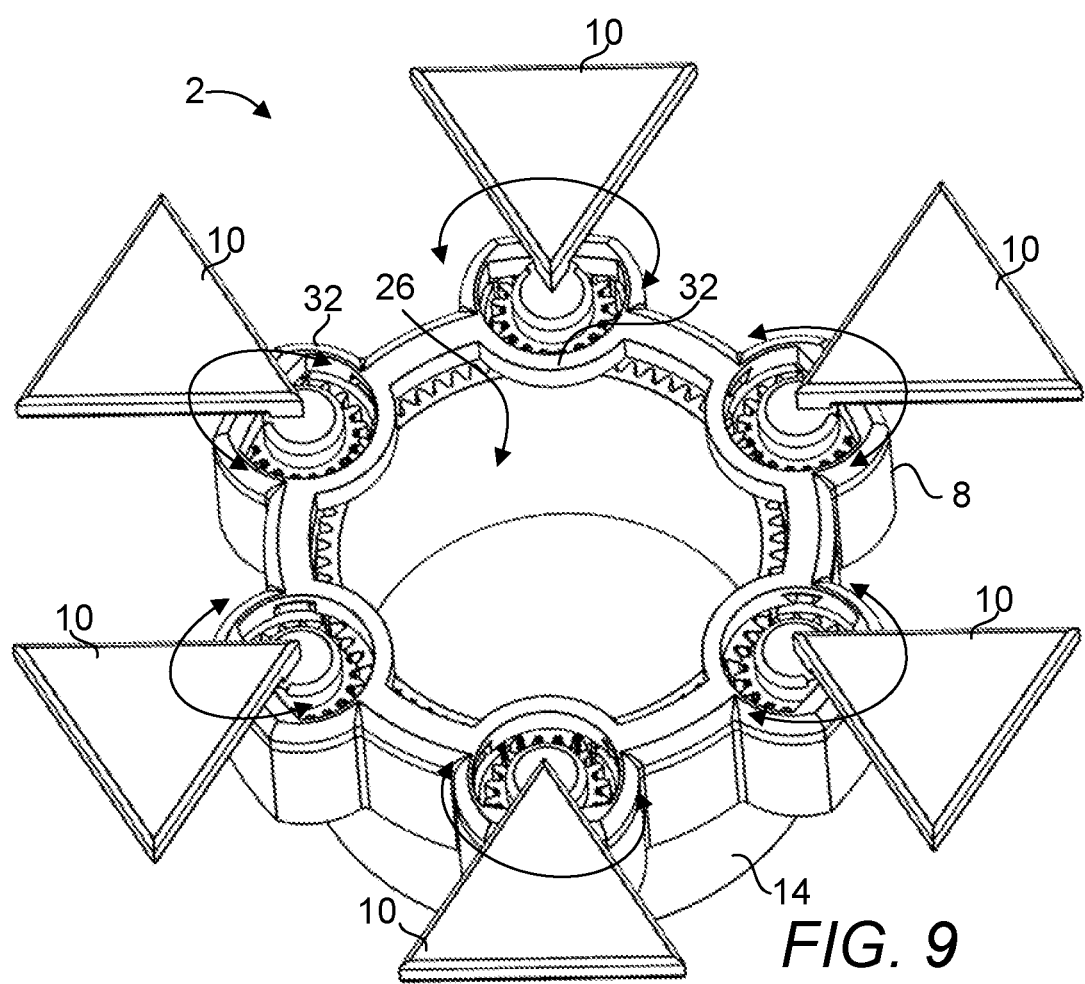
FIG. 9 is a top perspective view of a container of having an interior space exposed by disposing the door which covers an opening to the interior space in an orientation where the cover components are fully extended from the opening.
Figure 10:
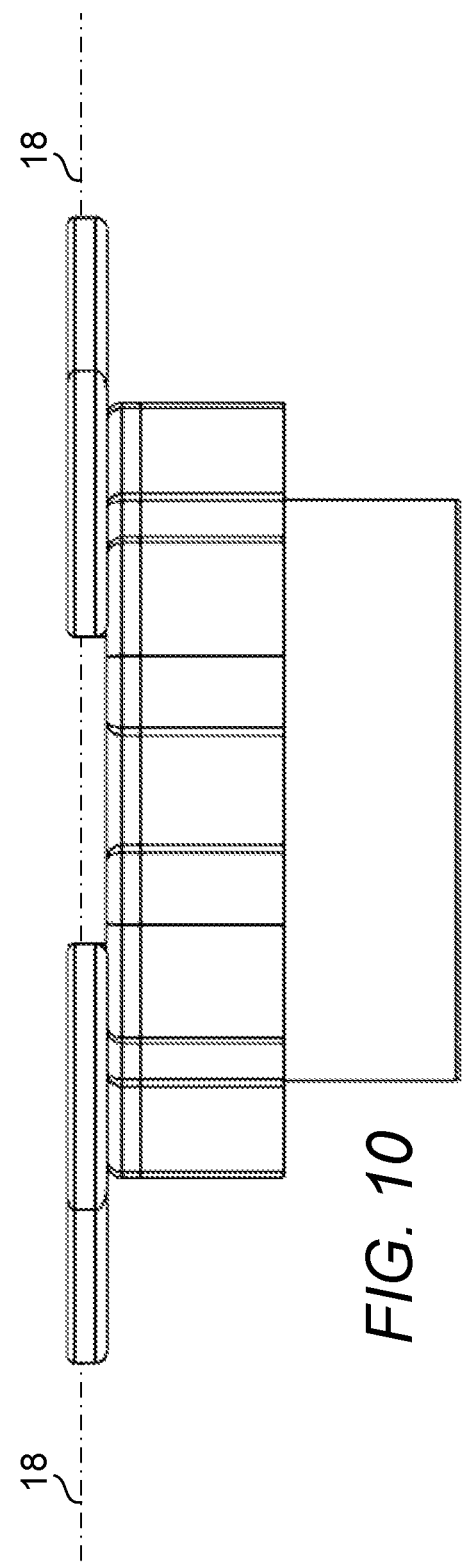
FIG. 10 is a side view thereof.

FIG. 8 is a top perspective view of a container of having an interior space exposed by disposing the door which covers an opening to the interior space in an orientation to just clear the opening to the interior space 26; As FIG. 9 is a top perspective view of a container of having an interior space exposed by disposing the door which covers an opening to the interior space in an orientation where the cover components 10 are fully extended from the opening; FIG. 10 is a side view thereof; It shall be noted that the cover components 10 fully clear the opening of the container and the cover components are disposed in the same plane 18 they are disposed in while the cover is disposed in the closed position. Referring to FIG. 8, a relative rotation of the structures 8, 14 indicated as relative rotation 36 will cause the planetary gears 6 to rotate in direction 38 until cover components 10 eventually come together with their vertices meeting along the central axis of the ring 8 in one of the two terminal closed states. Conversely, a relative rotation of the structures 8, 14 indicated as relative rotation 42 will cause the planetary gears 6 to rotate in direction 40 until cover components 10 eventually come together with their vertices meet along the central axis of the ring 8 in the other one of the two terminal closed states.

Figure 11:
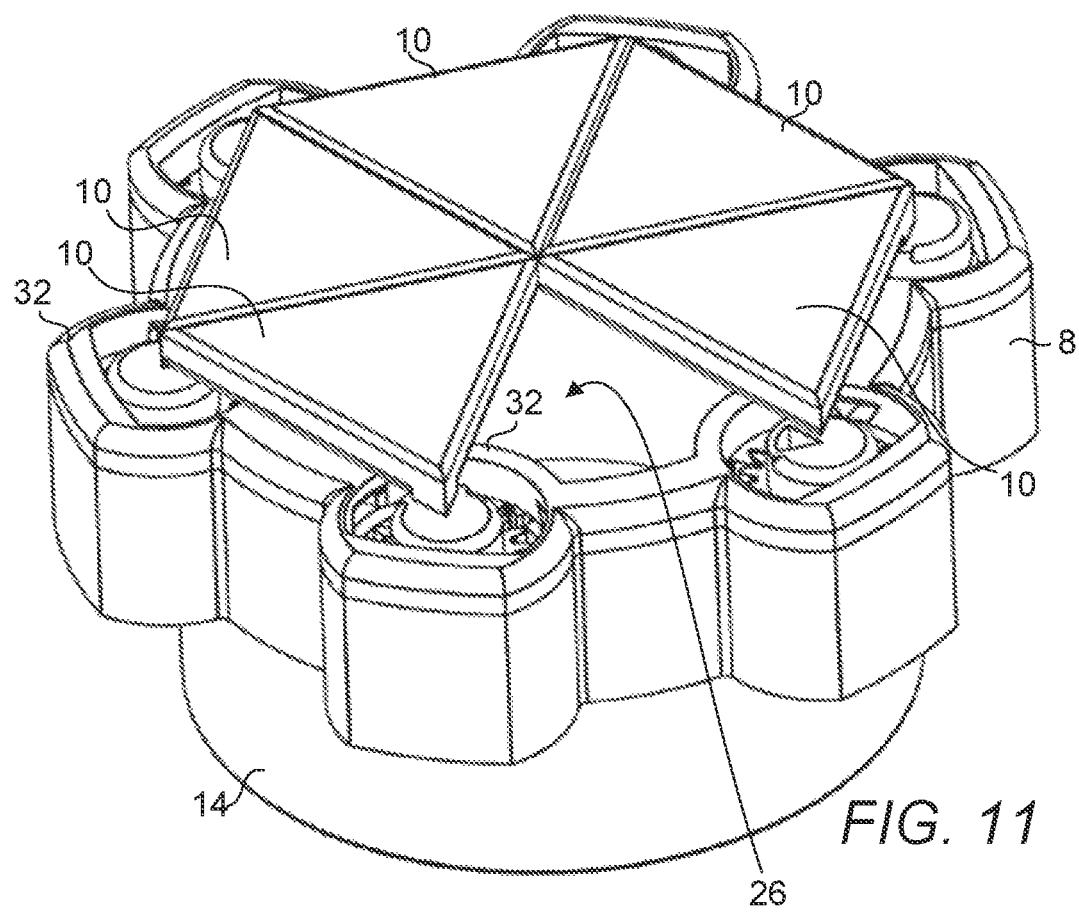
FIG. 11 is a top perspective view of the container of FIG. 1 with a cover component disposed in an orientation to reveal a portion of the interior space of the container.
Figure 12:
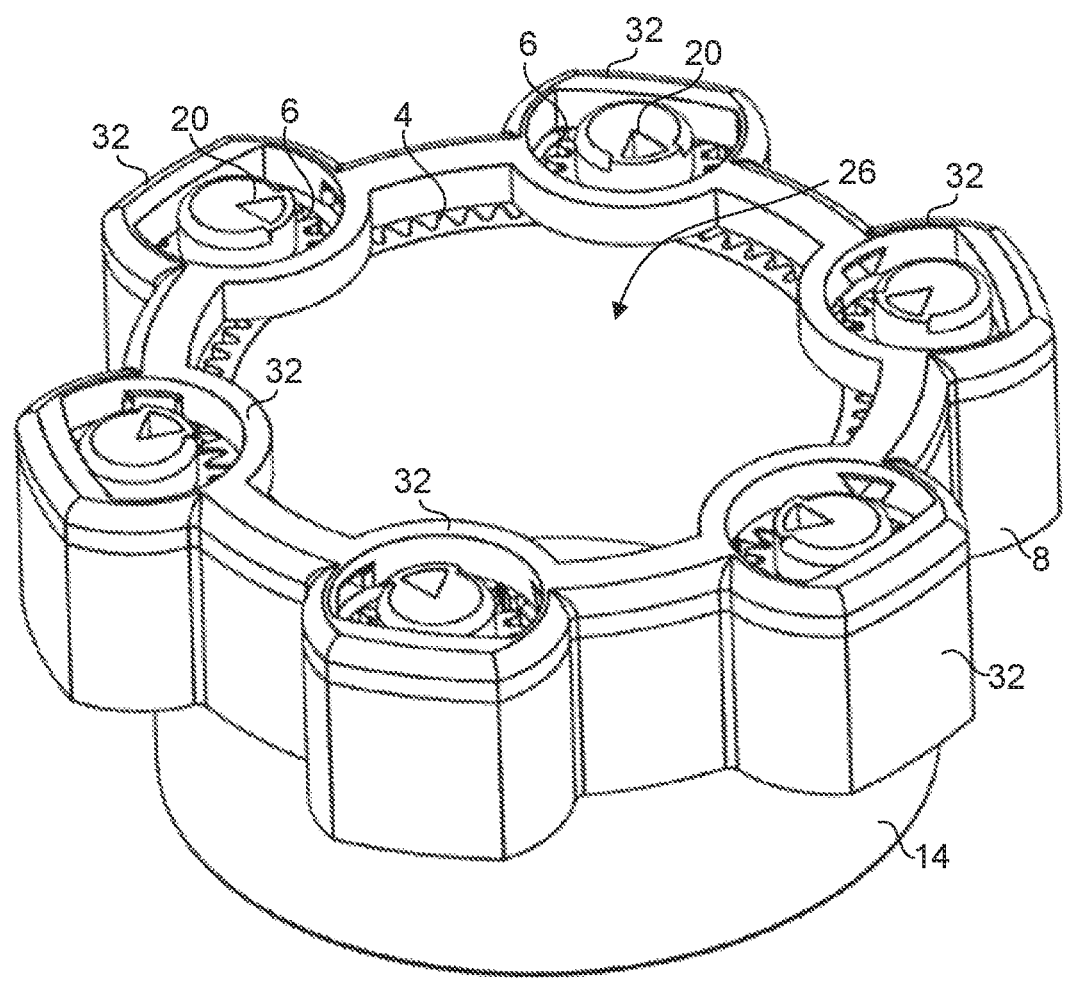
FIG. 12 is a top perspective view of the container of FIG. 1 with all cover components disposed in an orientation to reveal the interior space of the container.
Figure 13:
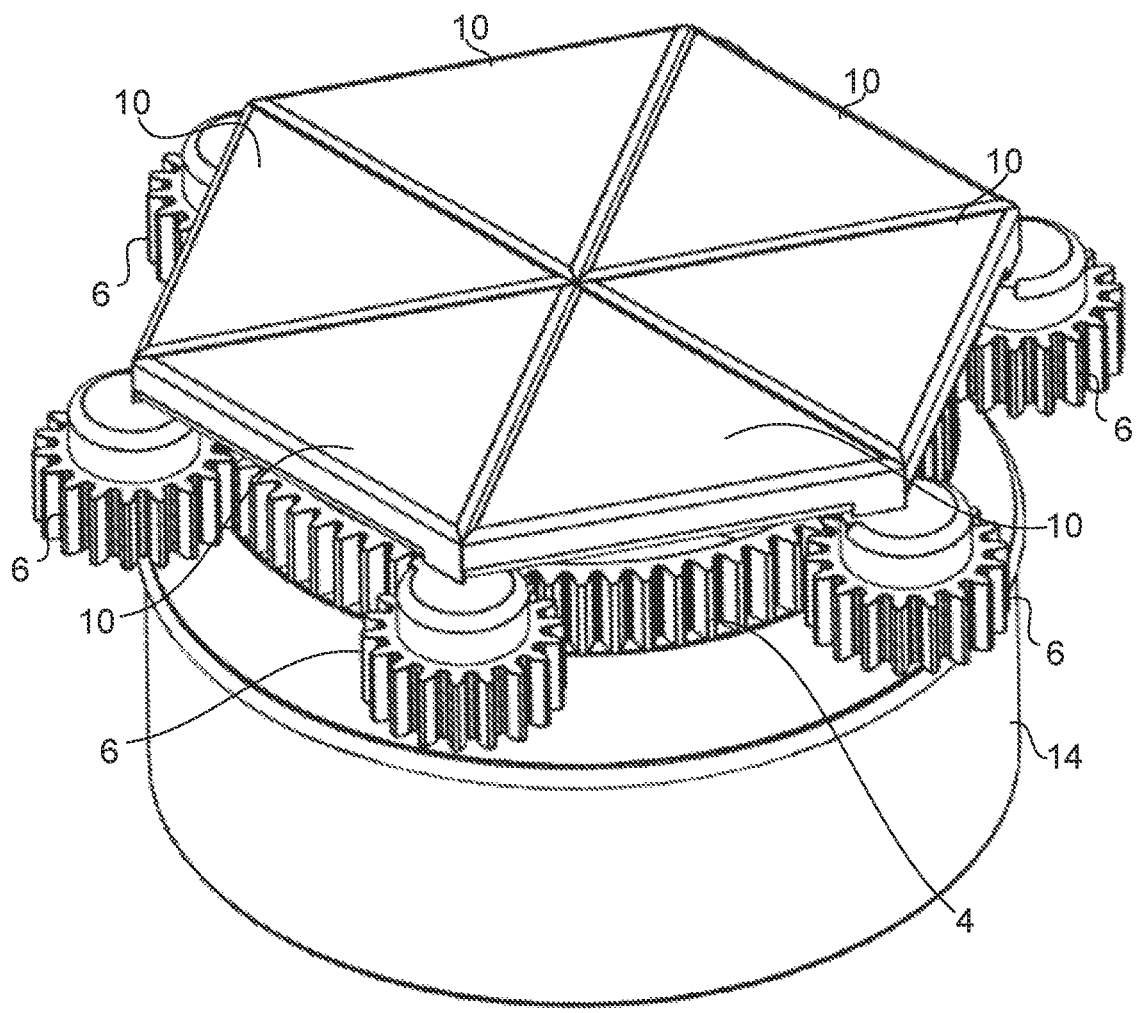
FIG. 13 is a top perspective view of the container of FIG. 1 with the structure supporting the planetary gears removed to reveal relationships between several planetary gears and the sun gear.
Figure 14:
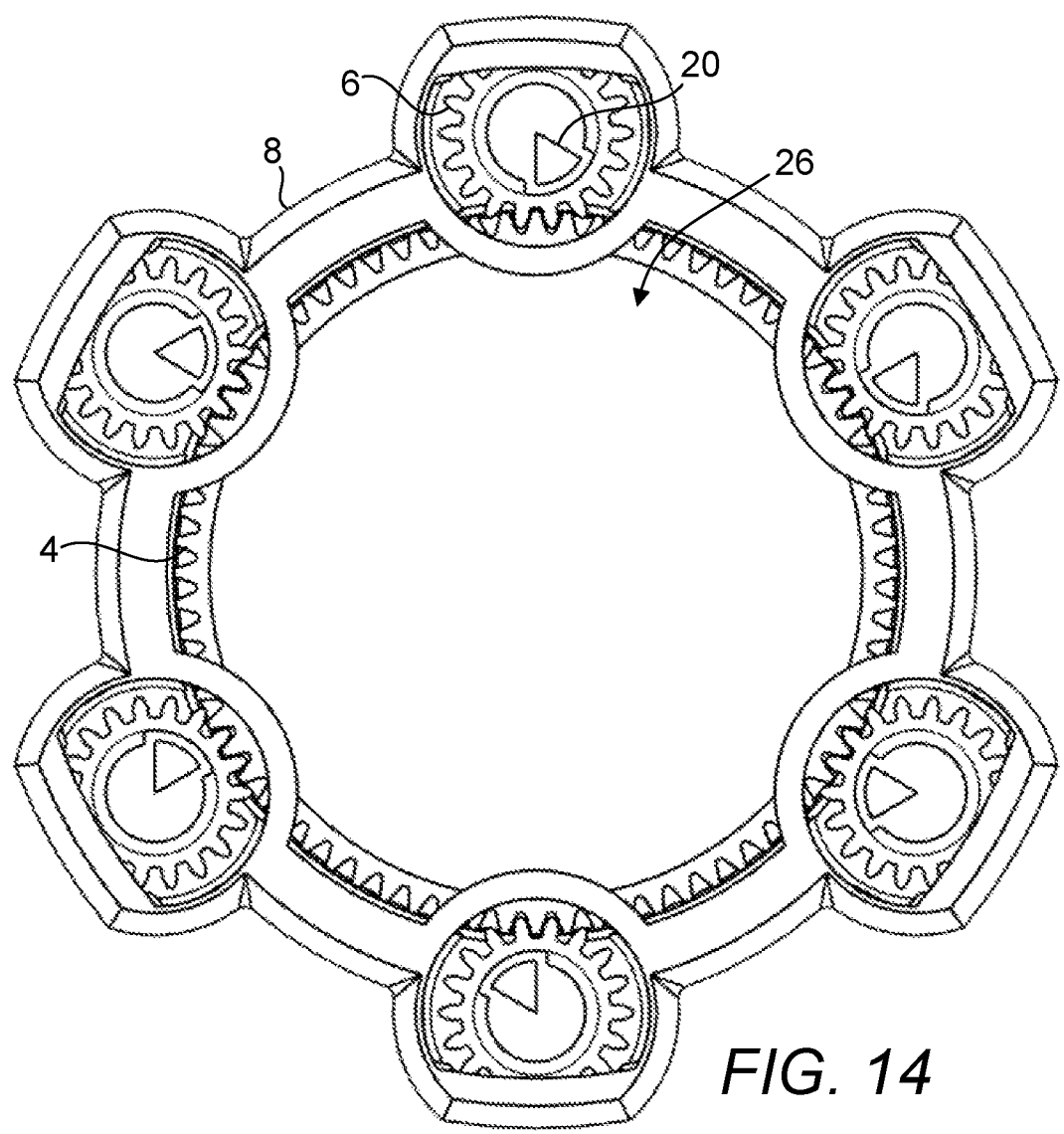
FIG. 14 is a top view of the container of FIG. 1 with all cover components removed to reveal the interior space of the container.
Figure 15:
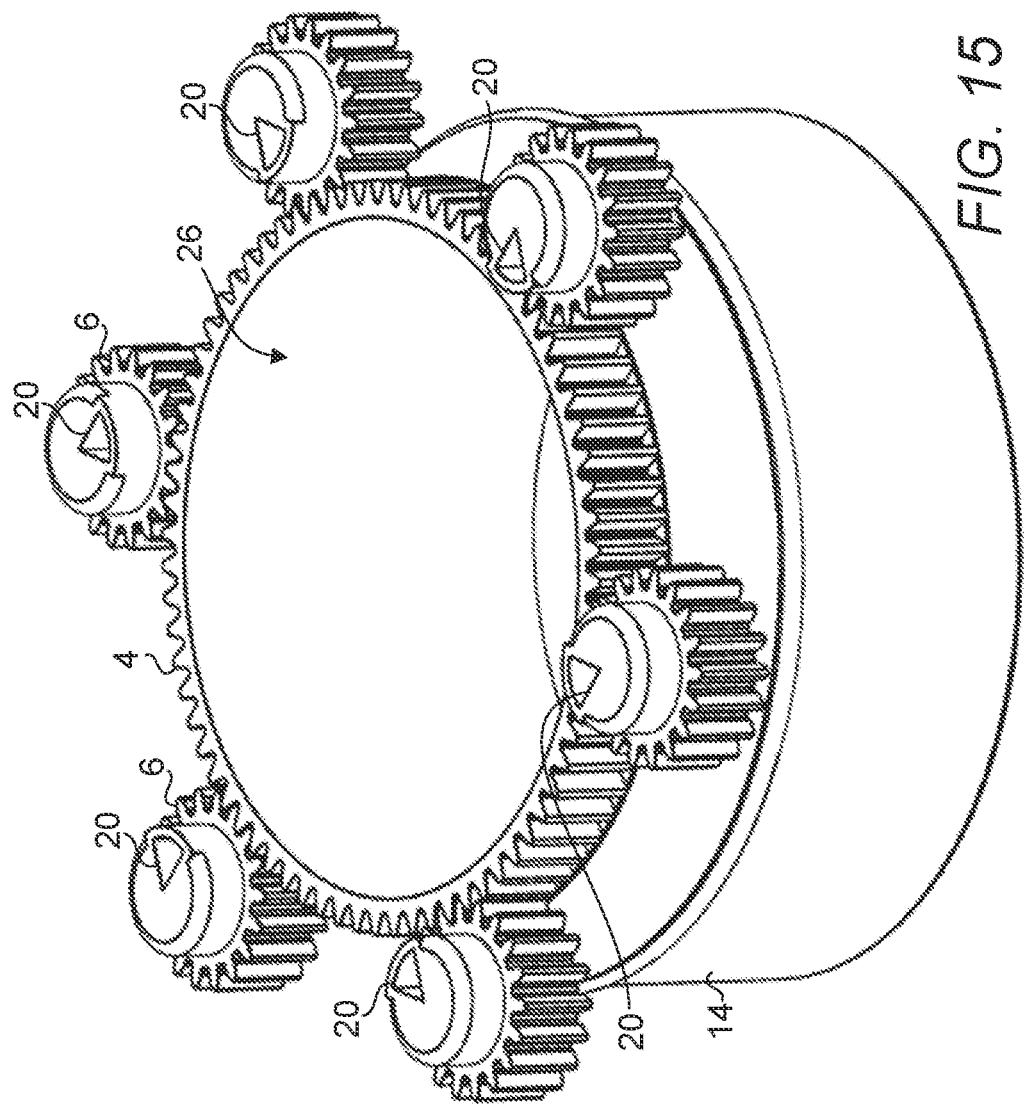
FIG. 15 is a top perspective view of the container of FIG. 1 with the structure supporting the planetary gears removed to reveal relationships between several planetary gears and the sun gear and the cover components removed to reveal the interior space of the container.

FIG. 11 is a top perspective view of the container of FIG. 1 with a cover component 10 removed to reveal a portion of the interior space of the container. FIG. 12 is a top perspective view of the container of FIG. 1 with all cover components 10 removed to reveal the interior space of the container. FIG. 13 is a top perspective view of the container of FIG. 1 with the structure 8 supporting the planetary gears removed to reveal relationships between several planetary gears 6 and the sun gear 4. FIG. 14 is a top view of the container of FIG. 1 with all cover components 10 removed to reveal the interior space of the container. FIG. 15 is a top perspective view of the container of FIG. 1 with the structure 8 supporting the planetary gears removed to reveal relationships between several planetary gears 6 and the sun gear and the cover components 10 removed to reveal the interior space 26 of the container.

Figure 16:
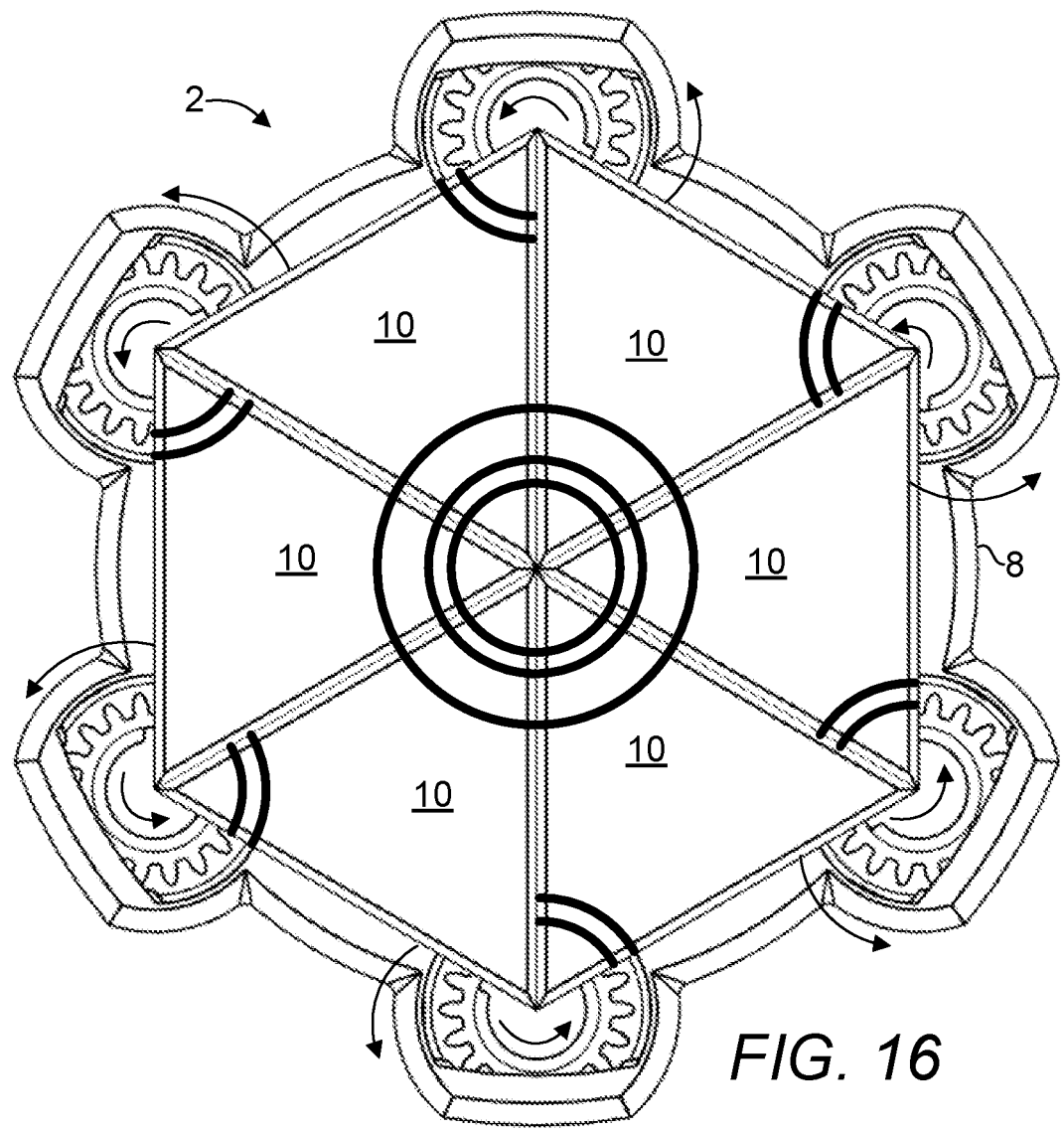
FIG. 16 is a top view of a container with two images disposed on the door of the container where the first image is being displayed while the cover is disposed in the first closed state.
Figure 17:
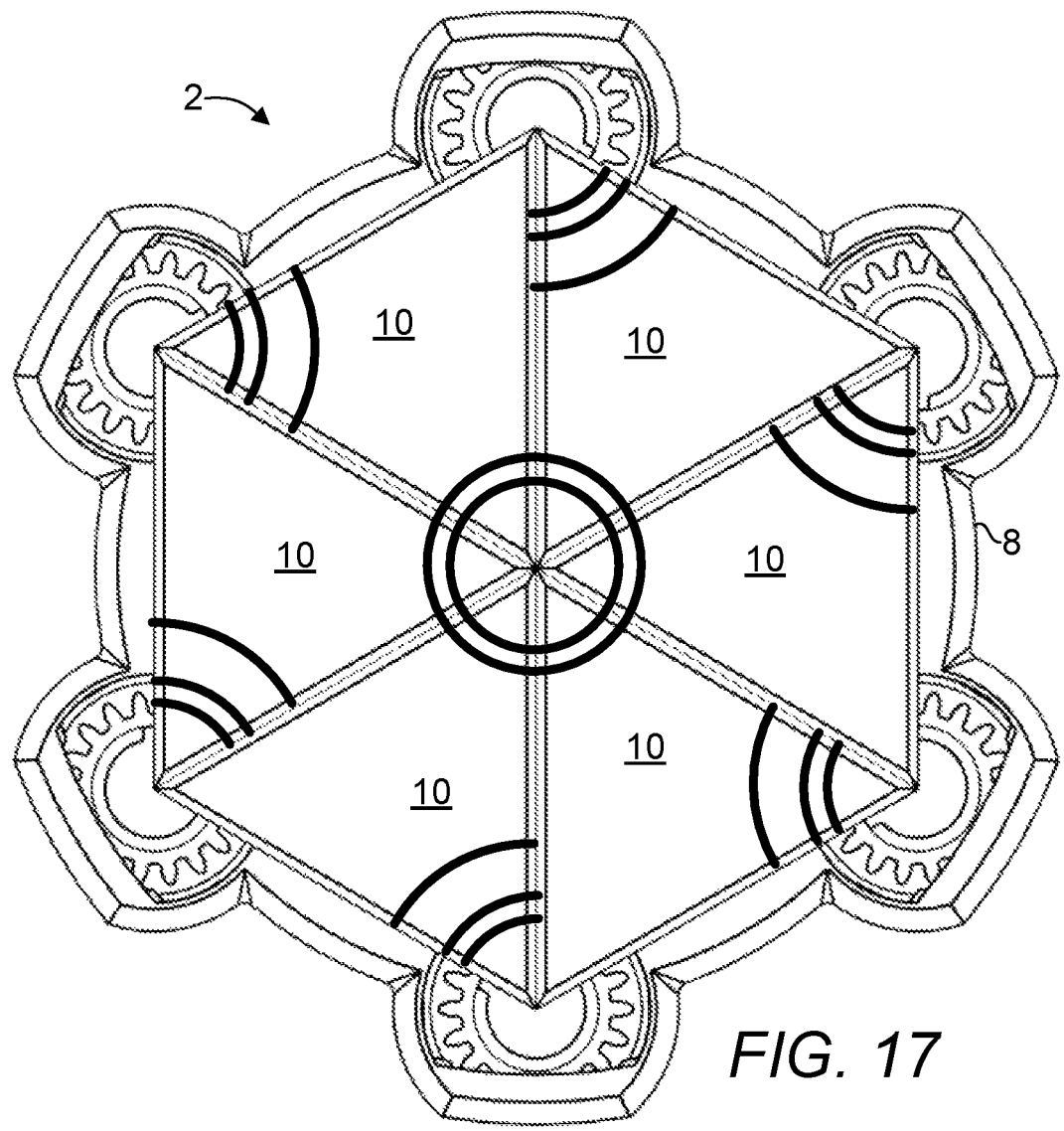
FIG. 17 is a top view of a container with two images disposed on the door of the container where the second image is being displayed while the cover is disposed in the second closed state.

FIG. 16 is top view of a container with two images disposed on the door of the container where the first image is being displayed while the cover is disposed in the first closed state. FIG. 17 is top view of a container with two images disposed on the door of the container where the second image is being displayed while the cover is disposed in the second closed state. It shall be noted that, in the closed state of FIG. 16, the image that is displayed is the three concentric circles. As a relative rotation between the ring 8-housing 14 is exerted on the container to cause the planetary gears to each rotate in the counterclockwise direction about axis of rotation 34, the cover will eventually assume another closed state shown in FIG. 17. Therefore, with only one cover, two images can be shown depending on the closed state at which the cover is disposed. It shall be noted that the image formed in FIG. 17 is of two concentric circles, i.e., an image that is different from the image in FIG. 16 although the cover components 10 in both FIGS. 16 and 17 are the same cover components 10. In one embodiment, the cover is configured to be disposed in one of two closed states and an angle of rotation between the two closed states is about 300 degrees. The cover components can be disposed in an open state from a closed state or disposed in a closed state from an open state with a relative rotation as little as 15 degrees, an angle of rotation which is significantly less than an angle of rotation required to open a hinged door fully, e.g., at least 90 degrees of rotation or for a sliding door, the traversal of the entire width of the door.

Figure 18:
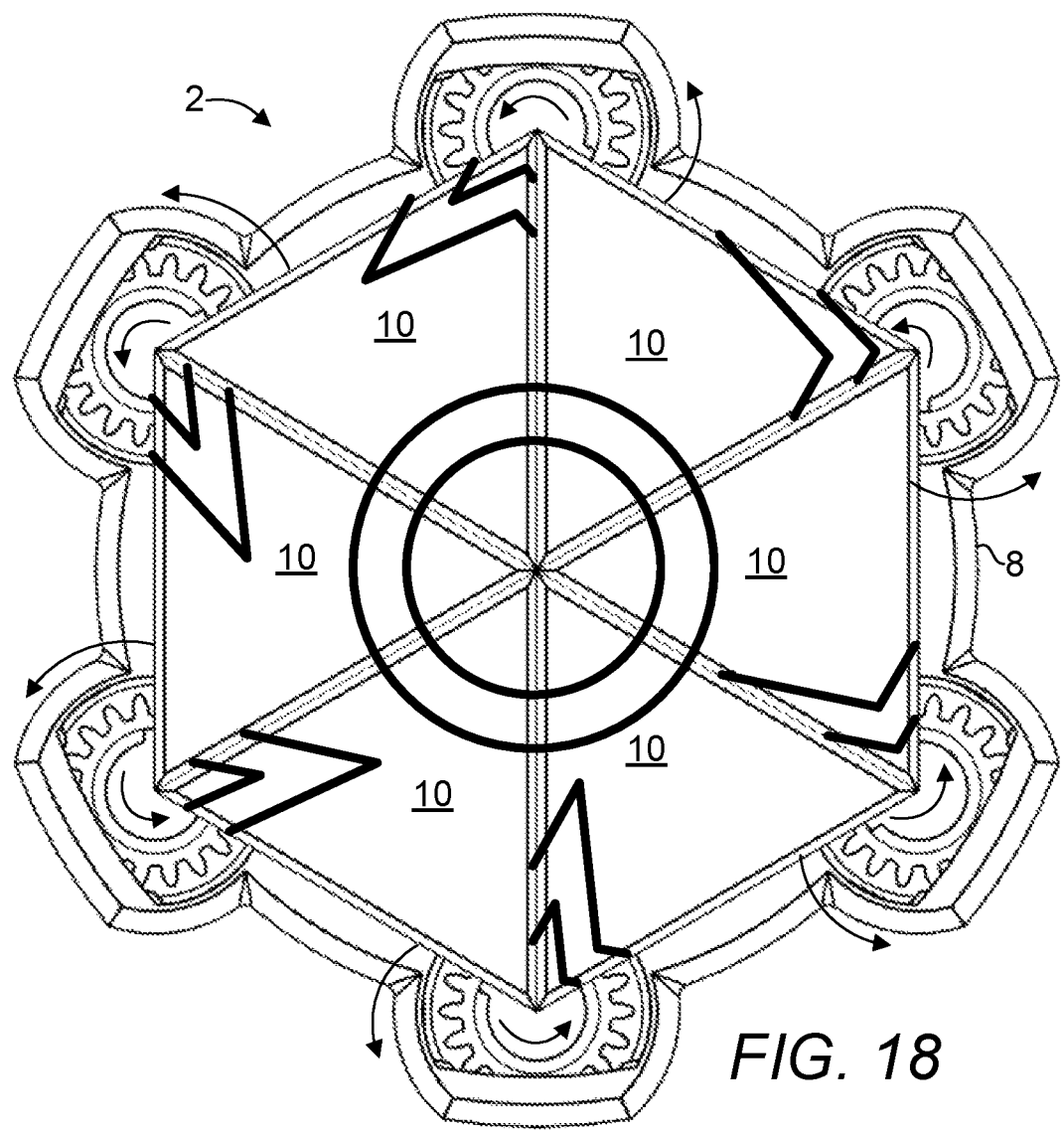
FIG. 18 is a top view of a container with two images disposed on the door of the container where the first image is being displayed while the cover is disposed in the first closed state.
Figure 19:
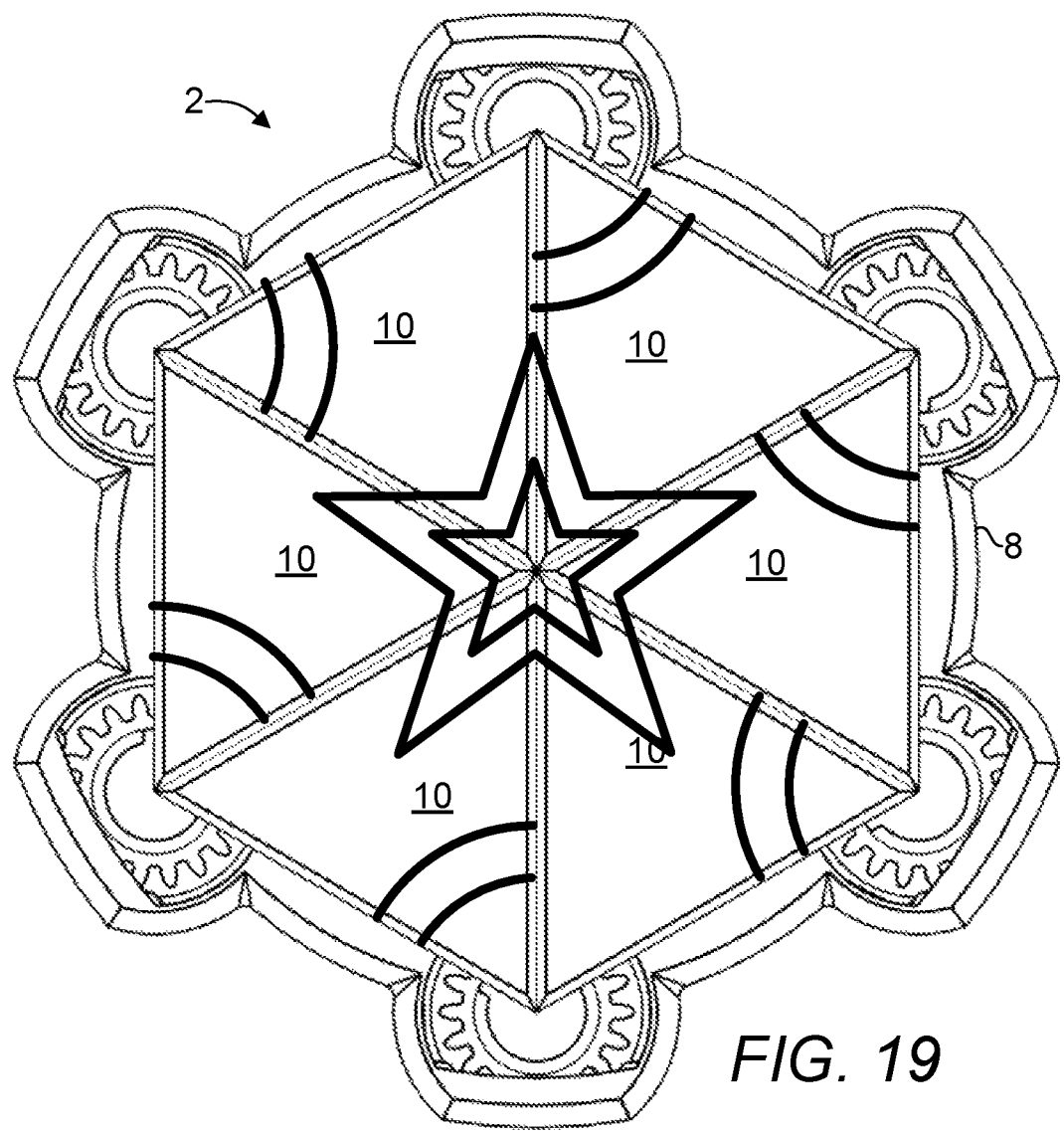
FIG. 19 is a top view of a container with two images disposed on the door of the container where the second image is being displayed while the cover is disposed in the second closed state.

FIG. 18 is a top view of a container with two images disposed on the door of the container where the first image is being displayed while the cover is disposed in the first closed state. FIG. 19 is a top view of a container with two images disposed on the door of the container where the second image is being displayed while the cover is disposed in the second closed state. It shall be noted that, in the closed state of FIG. 18, the main image that is displayed centrally is a circle. As a relative rotation between the ring 8-housing 14 is exerted on the container to cause the planetary gears to each rotate in the counterclockwise direction about axis of rotation 34, the cover will eventually assume another closed state shown in FIG. 19. Therefore again, with only one cover, two images can be shown depending on the closed state at which the cover is disposed. It shall be noted that the image formed in FIG. 19 is of a star, i.e., an image that is different from the image in FIG. 18 although the cover components 10 in both FIGS. 18 and 19 are the same cover components 10.

Figure 20:
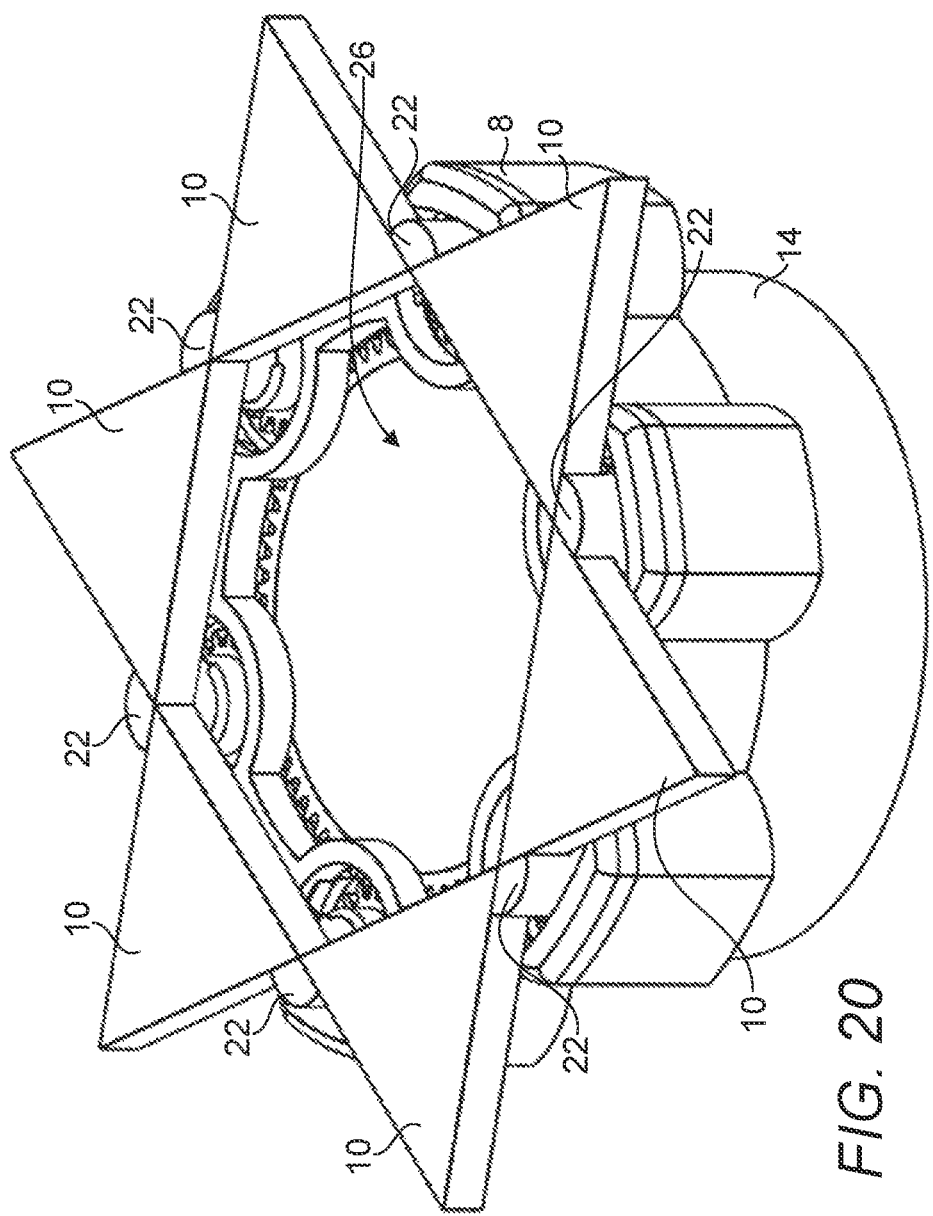
FIG. 20 is a top perspective view of a container with the cover components disposed in the fully open position where the cover components are positionally limited to the configuration shown.
Figure 21:
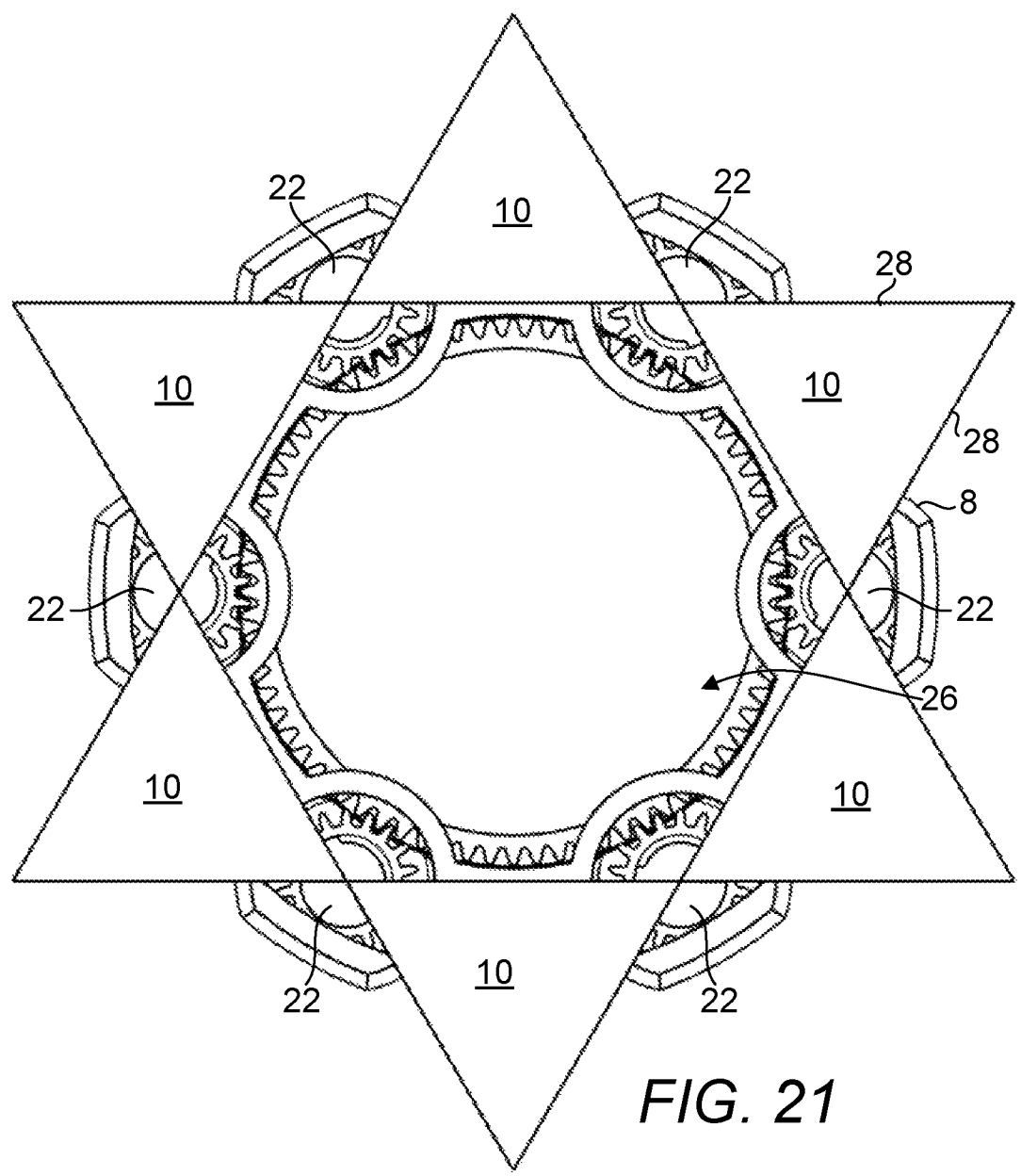
FIG. 21 is a top view thereof.

FIG. 20 is a top perspective view of a container with the cover components disposed in the fully open position where the cover components are positionally limited to the configuration shown; FIG. 21 is a top view thereof. It shall be noted that, in this embodiment, each of the cover components includes a stopper 22 and the cover is configured to be disposed in only one closed state. Here, in its open state, the cover components 10 together form a "star of David." In one embodiment, the container can be used for storing valuables, e.g., an engagement ring, when the container is presented in a marriage proposal.

Figure 22:
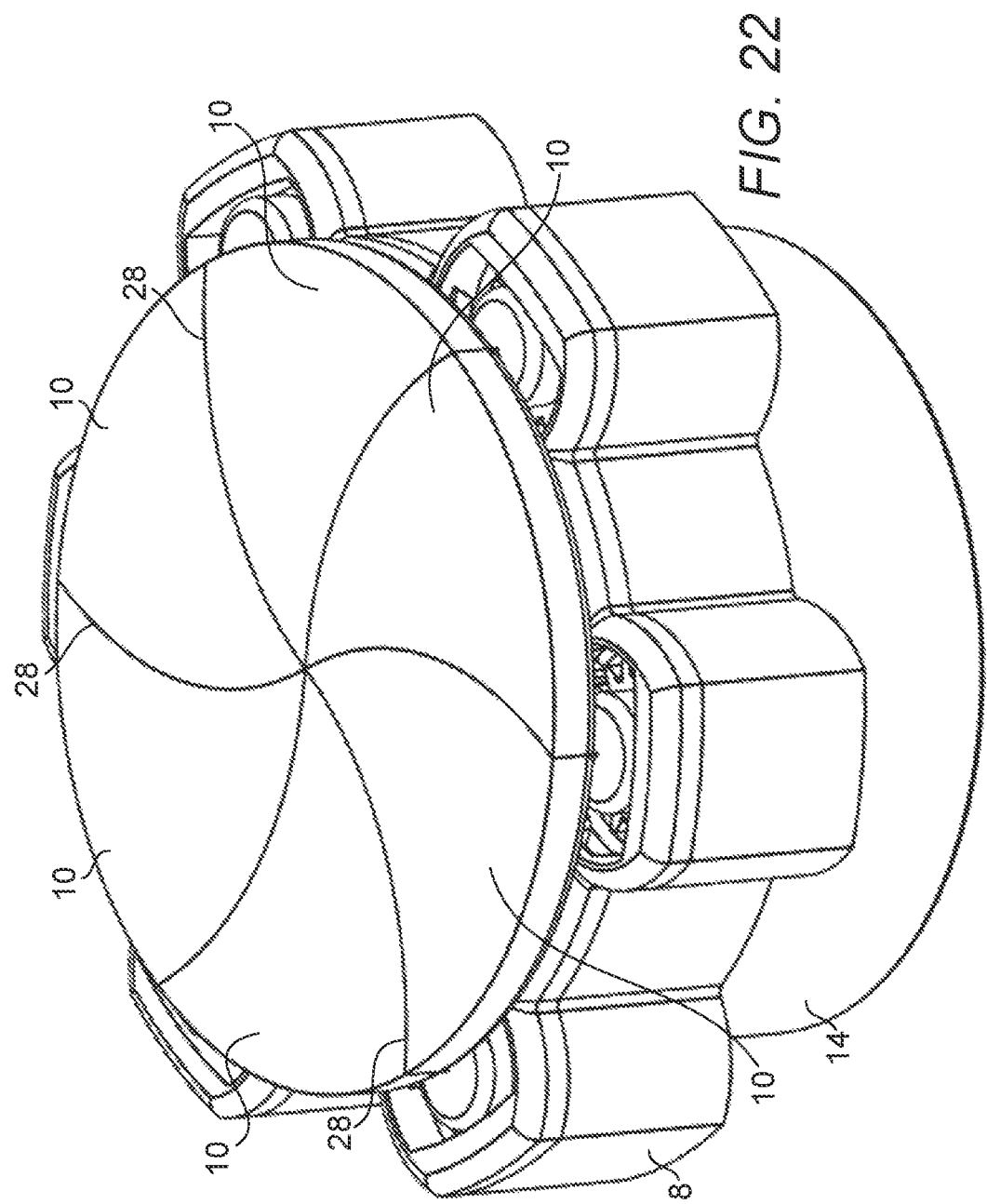
FIG. 22 is a top view of a container with the cover components having edges that are not rectilinear from the center of the cover to the outer perimeter of the cover where the cover is disposed in a closed state.
Figure 23:
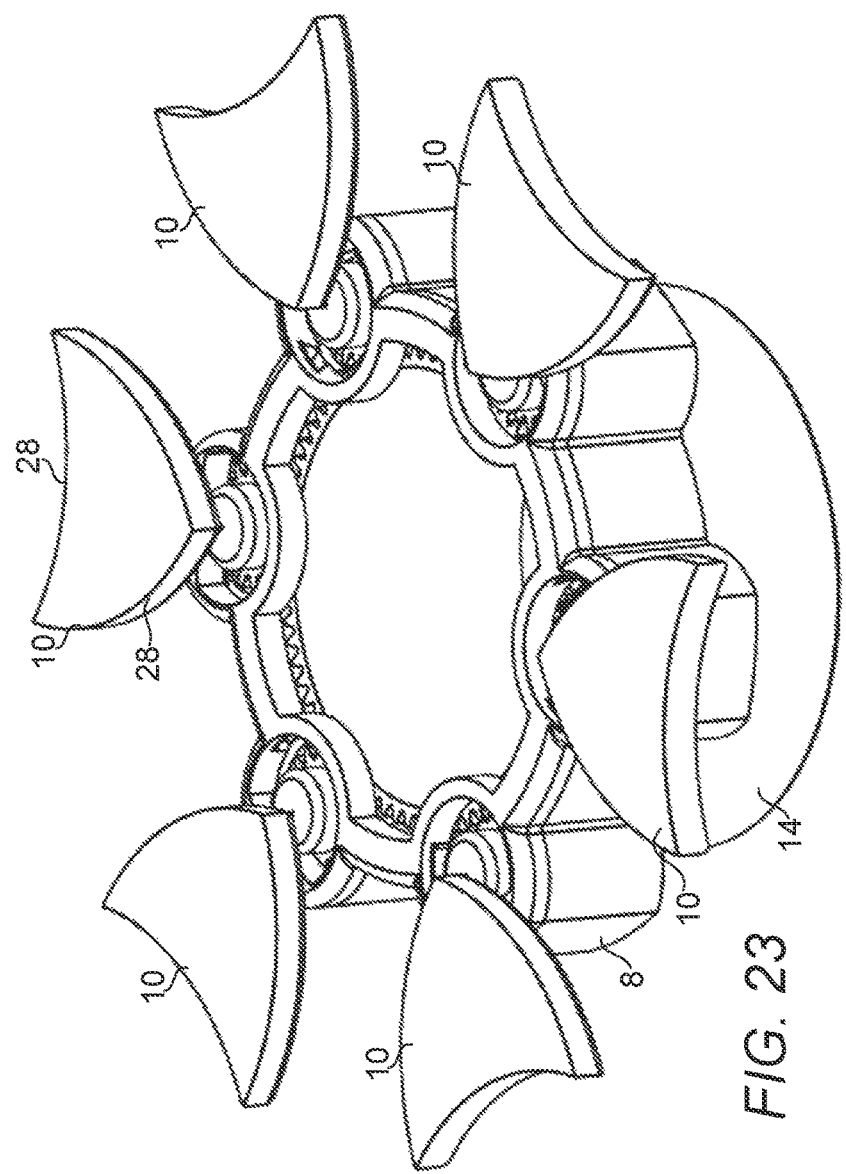
FIG. 23 is a top view of a container with the cover components having edges that are not rectilinear from the center of the cover to the outer perimeter of the cover where the cover is disposed in an open state.

FIG. 22 is a top view of a container with the cover components having edges 28 that are not rectilinear from the center of the cover to the outer perimeter of the cover where the cover is disposed in a closed state. FIG. 23 is a top view of a container with the cover components having edges that are not rectilinear from the center of the cover to the outer perimeter of the cover where the cover is disposed in an open state. In one embodiment, at least one of the cover components includes a sector including at least one edge that is non-rectilinear. It shall be noted that, the edges need not be rectilinear. For each cover component 10, as long as the edges converge to a vertex at a central point of the opening and each of the planetary gear 6 is configured to rotate about an axis of rotation that coincides with a vertex of a polygonal opening shape, the cover components 10 can be moved from a cover open state to a cover closed state or from a cover closed state to a cover open state without interference.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A door for allowing access to an interior space of a housing, one end of the housing is sealed with a cover having a plurality of cover components, said door comprising:
    (a) a sun gear comprising a rotational axis, said sun gear configured to be attached to the housing;
    (b) a ring having a central axis coaxially disposed with said rotational axis of said sun gear; and
    (c) a plurality of planetary gears evenly distributed about said central axis of said ring, each said planetary gear comprising a rotational axis and rotationally coupled to said ring and said sun gear, wherein said rotational axis of each said planetary gear is disposed parallel to said central axis of said ring,
    wherein each of the cover components is configured to be attached to one of said plurality of planetary gears and when said ring is rotated with respect to the housing, the plurality of cover components separate to allow access to the interior space of the housing and the cover is configured to be disposed in one of two closed states and an angle of rotation between said two closed states is about 300 degrees.

2. The door of claim 1, wherein said plurality of planetary gears is six planetary gears.

3. The door of claim 1, further comprising two images, each associated with said one of said two closed states.

4. The door of claim 1, wherein each said cover component comprises a stop and the cover is configured to be disposed in only one of said two closed states.

5. The door of claim 1, wherein at least one of said cover components comprises a sector comprising at least one edge that is non-rectilinear.

6. The door of claim 1, wherein the cover comprises a polygonal shape.

7. The door of claim 6, wherein the cover is a hexagon.

8. A device for disposing a plate in two states, the plate composed of a plurality of plate components, said device comprising:
    (a) a sun gear comprising a rotational axis, said sun gear configured to be attached to a member;
    (b) a ring having a central axis coaxially disposed with said rotational axis of said sun gear; and
    (c) a plurality of planetary gears evenly distributed about said central axis of said ring, each said planetary gear comprising a rotational axis and rotationally coupled to said ring and said sun gear, wherein said rotational axis of each said planetary gear is disposed parallel to said central axis of said ring,
    wherein each of the plate components is configured to be attached to one of said plurality of planetary gears and the plate components are mustered in a first state and when said ring is rotated with respect to the member, the plurality of plate components separate to transition to a second state and the plate is configured to be disposed in one of two closed states and an angle of rotation between said two closed states is about 300 degrees.

9. The device of claim 8, wherein said plurality of planetary gears is six planetary gears.

10. The device of claim 8, further comprising two images, each associated with said one of said two closed states.

11. The device of claim 8, wherein each said plate component comprises a stop and the plate is configured to be disposed in only one of said two closed states.

12. The device of claim 8, wherein at least one of said plate components comprises a sector comprising at least one edge that is non-rectilinear.

13. The device of claim 8, wherein the plate comprises a polygonal shape.

14. The device of claim 13, wherein the plate is a hexagon.

15. A device for disposing a plate in two states, the plate composed of a plurality of plate components, said device comprising:
   (a) a first gear comprising a rotational axis, said first gear configured to be attached to a member;
   (b) a ring having a central axis coaxially disposed with said rotational axis of said first gear; and
   (c) a plurality of planetary gears evenly distributed about said central axis of said ring, each said planetary gear comprising a rotational axis and rotationally coupled to said ring and said first gear, wherein said rotational axis of each said planetary gear is disposed parallel to said central axis of said ring,
   wherein each of the plate components is configured to be attached to one of said plurality of planetary gears and the plate components are mustered in a first state and when said ring is rotated with respect to the member, the plurality of plate components separate to transition to a second state and the plate is configured to be disposed in one of two closed states and an angle of rotation between said two closed states is about 300 degrees.

16. The device of claim 15, wherein said first gear is a gear selected from the group consisting of a sun gear and a ring gear.

17. The device of claim 15, wherein the plate comprises a polygonal shape.

18. The device of claim 15, wherein said plate further comprises two images, each associated with said one of said two closed states.

* * * * *